C. R. VAN HORNE.
SELF PROPELLED VEHICLE.
APPLICATION FILED JULY 28, 1916.
1,219,887.
Patented Mar. 20, 1917.
2 SHEETS—SHEET 2.
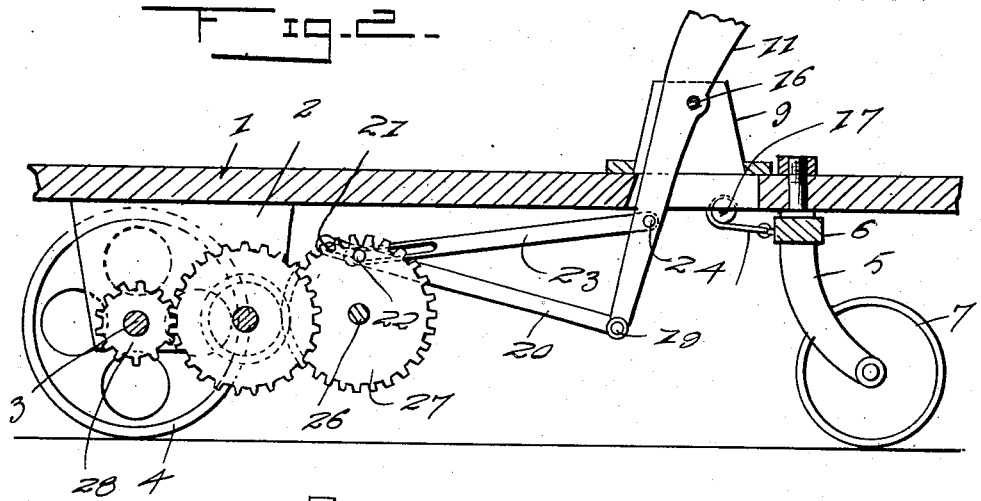
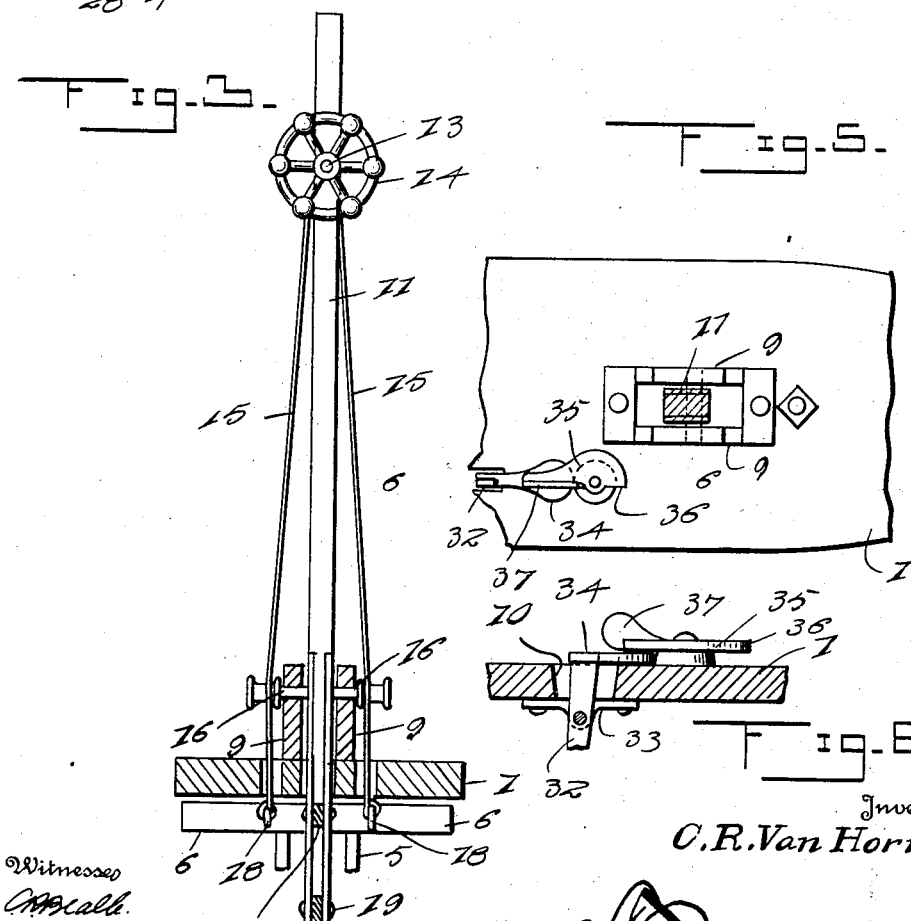
Witnesses
Inventor
C. R. Van Horne,
By
Attorney

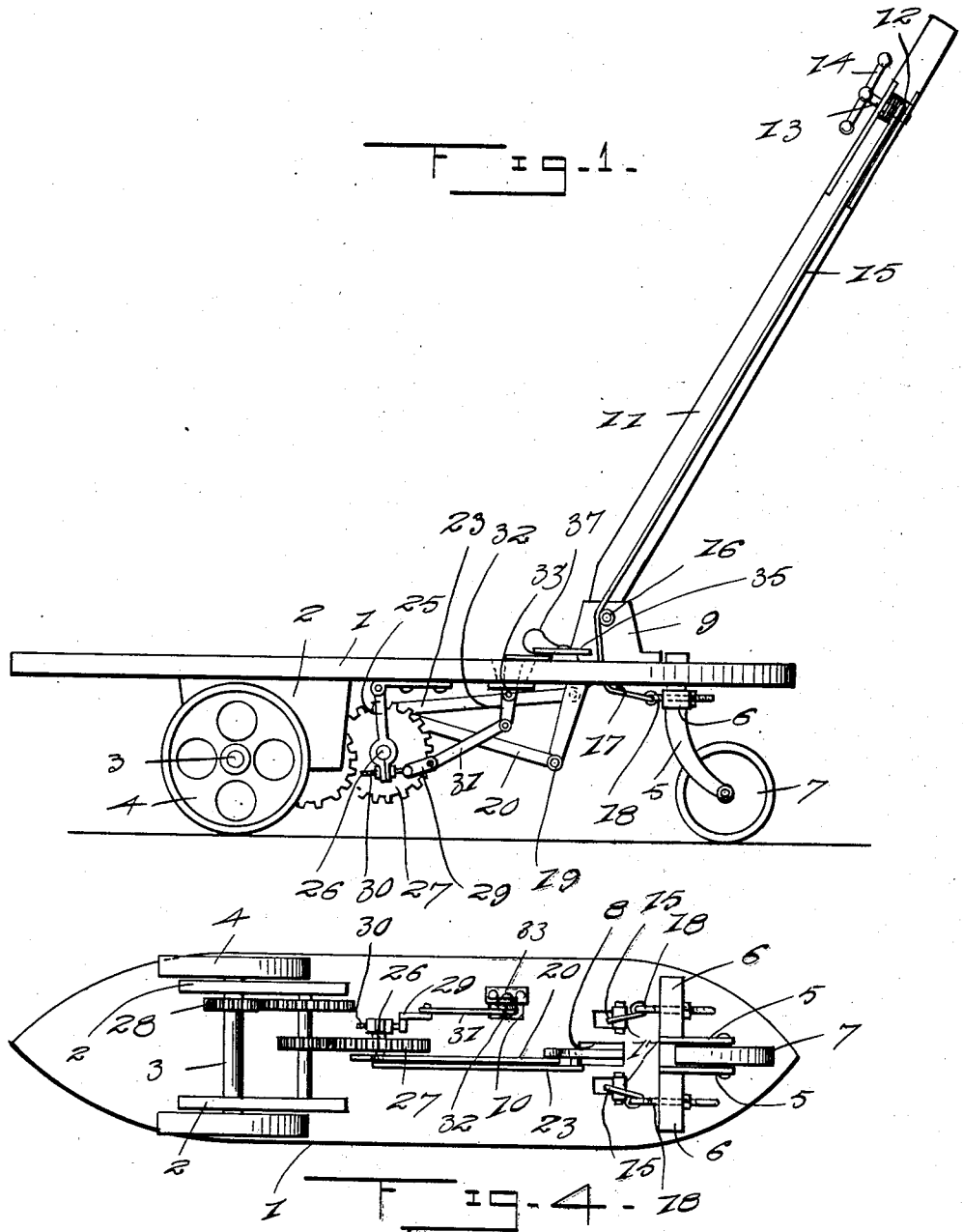

UNITED STATES PATENT OFFICE.

CHARLES R. VAN HORNE, OF ABERDEEN, WASHINGTON.

SELF-PROPELLED VEHICLE.

1,219,887.   Specification of Letters Patent.   Patented Mar. 20, 1917.

Application filed July 28, 1916. Serial No. 111,883.

*To all whom it may concern:*

Be it known that I, CHARLES R. VAN HORNE, a citizen of the United States, residing at Aberdeen, in the county of Chehalis and State of Washington, have invented certain new and useful Improvements in Self-Propelled Vehicles; and I do hereby declare the following to be a full, clear, and exact description of the invention, such as will enable others skilled in the art to which it appertains to make and use the same.

This invention relates to new and useful improvements in self propelled vehicles and the principal object of the invention is to provide a device of the ordinary "pushmobile" type which is adapted to be driven by the oscillation of a lever.

Another object of the invention is to provide a device having means for rendering the lever inoperative in order that the same may be used for coasting.

A further object of the invention is to provide a novel means for holding the gear train in and out of mesh and to also provide a means for overcoming the dead centers of the driving gear so as to insure the proper starting of the machine regardless of the position of the driving gear and lever.

Still another object of the invention is to provide a steering means for the device which is mounted upon the operating lever and is arranged to be operable regardless of the position of said lever.

With these and other objects in view, the invention consists in the novel combination and arrangement of parts which will be fully set forth in the following specification and accompanying drawings, in which:—

Figure 1 is a side view in elevation of a vehicle constructed in accordance with this invention.

Fig. 2 is an enlarged fragmentary longitudinal sectional view through the device.

Fig. 3 is an enlarged transverse sectional view through the device.

Fig. 4 is a bottom plan view of Fig. 1.

Fig. 5 is an enlarged fragmentary top plan view of Fig. 1, and

Fig. 6 is a sectional view on line 6—6 of Fig. 5.

Referring to the drawings by characters of reference the numeral 1 designates the platform of the device provided near its rear end with the downwardly extending spaced bearings 2 in which the drive axle 3 is journaled. This axle is provided with the wheels 4 which are adapted to support the rear end of the device as clearly shown in the drawings. A port 5 is rotatably mounted at the forward end of the platform and is provided with the cross member 6 the use of which will appear as the description proceeds. Journaled between the ends of the port is the front steering wheel 7 by means of which the direction or travel of the device is controlled. The platform 1 is formed near its forward end with a slot 8 and mounted on the upper side thereof and surrounding the slot is a bracket 9 in which the driving lever is pivotally mounted. A similar slot 10 is formed in the platform near the slot 8 and is adapted to receive the gear shifting control lever which will be more fully hereinafter described.

Pivotally mounted in the bracket 9 is the driving lever 11 which is arranged so that the forward movement of said lever will throw the same farther off from the vertical than the rear movement of the lever in order to afford a maximum amount of space for the occupant of the device. This lever 11 is formed near its free end with the transverse opening 12 having the shaft 13 journaled centrally therein which shaft carries the hand wheel 14 by means of which the same is rotated. A winding drum is mounted on the shaft and has connected thereto the flexible members 15 which pass downwardly beside the lever and over the rollers 16 and 17 and their lower ends are connected to the eye bolts 18 which extend through the bars 6 near opposite ends. It will thus be seen that regardless of the position of the lever the flexible members will at all times stay taut, in view of the fact that the rollers 16 are in alinement with the pivot of the lever. Pivotally mounted on the lower end of the lever as at 19 is a main connecting rod 20 which is provided near its opposite end with a slot 21 which slot is adapted to receive the crank pin 22 carried by the driving gear. An auxiliary connecting rod 23 is pivoted as at 24 to the lever and like the rod 20 is provided with a slot which is of considerably greater length that the slot 21 and is adapted to receive the crank pin 22. It will thus be seen that regardless of the position of the drive wheel the movement of the lever will cause said wheel to revolve and thereby drive the device.

In order to render the lever inoperative so that the device may be used for coasting a swinging bracket 25 is provided and carries the axle 26 of the main drive gear 27 which in turn meshes with a gear train for driving the pinion 28 mounted on the rear axle 3 as clearly shown in the drawings. A suitable link 29 is adjustably connected as at 30 to the bracket 25 and the forward end of said link is connected by a coöperating link 31 to the arm 32 which is pivoted as at 33 to the under side of the platform and projects through the slot 10 in said platform. This arm is formed at its upper end with the head 34 which extends forwardly as clearly shown in the drawings and is adapted to be engaged by the catch 35 when the gear is in mesh. When said gear is out of mesh it will be seen that the slot space 36 of the catch 35 is turned by means of the wing 37 so as to cause said catch to disengage the head and it will be apparent that upon exerting pull on the lever the bracket 25 will be moved forwardly thereby disengaging the gear train from the driving gear. When it is desired to throw the gear into mesh the lever is moved forwardly at its upper end and simultaneously pressure is applied to the head 34 thereby moving the same downwardly in the position shown in Fig. 6 and it will be apparent that upon swinging the catch around in the position illustrated in Fig. 5 the gear will be locked in place.

It will be understood that if so desired suitable runners may be attached to the wheels of the device and the driving mechanism moved so that the lever 11 may project upwardly at right angles to the platform or inclined slightly to the rear thereof to provide a mast for supporting a sail and when used as such it will be evident that the device will afford an excellent ice boat to which a suitable seat may be attached at the desire of the user. A suitable pin is inserted in the rear of the lever in order to support the same in its proper position and prevent it from accidentally moving on its pivot. It will be understood should such a seat be attached to the device it will be pivoted on a support so that the same can be swung from one side to the other of the device in order to counterbalance the tendency of the sail to tip the device to one side when the same is under way.

While in the foregoing there has been shown and described the preferred embodiment of this invention, it is to be understood that such changes may be made in the combination and arrangement of parts as will fall within the spirit and scope of the appended claims.

What is claimed is:—

1. A device of the class described including a platform, a drive wheel supporting said platform, a gear train for controlling the movements of the drive wheel, a drive gear meshing with said gear train, an oscillatory lever on said platform, a crank pin carried by the drive gear, a connecting rod connecting the end of the lever with the crank pin, an auxiliary connecting rod connecting the lever intermediate its end and fulcrum with the crank pin to overcome a dead center, a swinging arm pivotally mounted to the under side of the platform and supporting the drive gear and means to swing said arm so as to move the drive gear into and out of mesh with the gear train.

2. In a device of the class described, a platform, a steering wheel mounted at the forward end of the platform, drive wheels mounted at the rear end of the platform, a lever pivoted to the platform near its forward end, a gear train for driving the drive wheels, a master gear controlling the operation of the gear train, a crank pin on the master gear, a link connected to the lower end of the lever, said link being provided with a slot near its rear end for receiving the crank pin and a secondary link pivoted to the lever intermediate its lower end and its pivot point, the last mentioned link having a slot near its rear end of greater length than the slot in the first mentioned link, the last named slot being adapted to receive the crank pin and arranged so that its walls engage the crank pin to overcome the dead center.

In testimony whereof I affix my signature in presence of two witnesses.

CHARLES R. VAN HORNE.

Witnesses:
L. H. FAULKNER,
ARTHUR PORTIER.